United States Patent [19]
Watton

[11] 3,930,157
[45] Dec. 30, 1975

[54] PYROELECTRIC CAMERA TUBE SYSTEMS
[75] Inventor: Rex Watton, Malvern, England
[73] Assignee: British Secretary of State for Defence, London, England
[22] Filed: July 22, 1974
[21] Appl. No.: 490,592

[30] Foreign Application Priority Data
July 23, 1973    United Kingdom............... 35040/73

[52] U.S. Cl. ................ 250/330; 250/333; 250/338; 313/388
[51] Int. Cl.² ......................................... H01J 31/49
[58] Field of Search ........... 250/338, 330, 332, 334, 250/333; 357/31; 313/388

[56]  References Cited
UNITED STATES PATENTS

| | | | |
|---|---|---|---|
| 2,966,612 | 12/1960 | Fotland | 313/388 |
| 3,054,917 | 9/1962 | Eberhardt | 250/330 |
| 3,144,575 | 8/1964 | Babits | 313/388 |
| 3,483,320 | 12/1969 | Gebel | 250/330 |
| 3,831,029 | 8/1974 | Jones et al. | 250/330 |

Primary Examiner—Harold A. Dixon
Attorney, Agent, or Firm—Elliott I. Pollock

[57] ABSTRACT

A pyroelectric camera tube system is characterized by an electrical impedance connected at one end to the pick up electrode on the pyroelectric target of the tube and a steady positive voltage source connected to the other end of the impedance, and in that the product of the resistance $R_T$ and the capacitance $C_T$ of the pyroelectric target is Rh. in the range $1000\tau_F \geq R_T C_T \geq \frac{1}{2}\tau_F$, preferably in the range $100\tau_F \geq R_T C_T \geq 3\tau_F$, where $\tau_F$ is the scanning period (alternatively known as the field time) required for the electron beam of the tube to be repetitively scanned across the pyroelectric target. Such a system provides quenching of an excess negative charge left from the electron beam on the target by positive charge leakage from the voltage source and thus obviates the need for ionized gas as used in conventional tubes. The pyroelectric target material may be lead germanate, lead germanate silicate or lithium sulphate.

10 Claims, 1 Drawing Figure

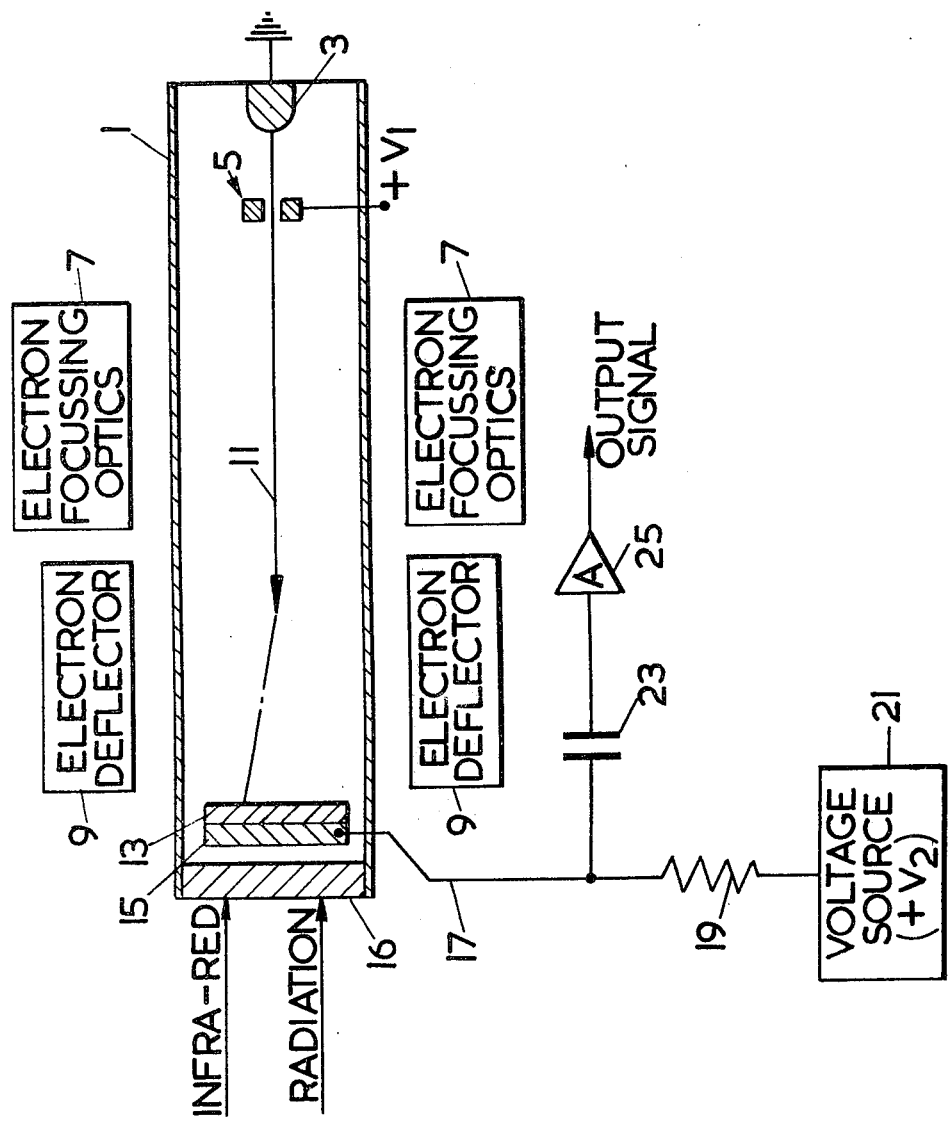

PYROELECTRIC CAMERA TUBE SYSTEMS

The present invention relates to pyroelectric camera tube systems.

Pyroelectric camera tubes or vidicons are devices which are used to detect thermal radiation emitted by the objects in a given scene of interest and to provide an electrical video signal which can be converted in a separate transducer into a visual image contrasting the various temperatures within the scene. The detection of the thermal radiation is carried out by a target which operates by the pyroelectric effect: when the temperature of a localized region of the material of the target is exposed to a change in temperature, the electric polarization of the material changes in that region and, as a result, the amount of electric charge present on the neighbouring surfaces of the target changes. The surface electric charge pattern developed on the target is therefore an image of the temperature distribution within the detected scene. The charge pattern is read out electrically through an electrode on one side of the target by scanning an electron beam generated within the tube across the opposite side of the target.

It is necessary to create a layer of positive charge on the target to quench the negative charge from the electron beam in regions where the pyroelectric charge pattern is such as to leave the negative charge from the electron beam partly or completely unaffected.

It has been widely considered that pyroelectric camera tubes made from triglycine sulphate (TGS) and its known derivatives give optimum operating conditions. However in such pyroelectric camera tubes it has always been considered necessary to provide the layer of quenching positive charge by having an inert gas in the tube, ionizing the gas and directing the positive ions towards the pyroelectric target by a combination of electrical grids. This arrangement can be relatively complicated.

It is an object of the present invention to reduce these complications in a pyroelectric camera tube system.

According to the present invention a pyroelectric camera tube system includes a pyroelectric target comprising a piece of pyroelectric material, means for repetitively scanning an ionic beam across a surface of the pyroelectric target, an electrode connected electrically to the pyroelectric target for the purpose of producing an output signal corresponding to the quantity of pyroelectric charge developed at the part of the pyroelectric target scanned by the ionic beam, and characterized by an electrical impedance electrically connected to the electrode and a voltage source electrically connected through the electrical impedance to the electrode for the purpose of applying to the pyroelectric target through the impedance a quantity of electric charge capable of quenching any excess charge produced on the pyroelectric target from the ionic beam, and in that the pyroelectric target has an electrical resistance $R_T$ and, when exposed to the ionic beam, an electrical capacitance $C_T$ such that the product of $R_T$ and $C_T$ lies between one half of and one thousand times the mean scanning period at which the means for repetitively scanning is capable of scanning the ionic beam across the surface of the pyroelectric target.

The tube of such a system does not need an ionized gas and hence does not need to be so complicated as the prior art tubes since the quenching charge is obtained by charge leakage through the pyroelectric target from the said voltage source.

By the "scanning period" (alternatively known as the field time or the integration time) is meant the time between successive scans of a given element of area of the surface of the pyroelectric target.

Preferably the product $R_T C_T$ lies between three times and 100 times the mean scanning period.

Preferably the electrical impedance is an electrical resistor.

Preferably the ionic beam is an electron beam. In that case the voltage produced by the said voltage source is positive so as to produce a quantity of positive charge at the said surface of the pyroelectric target. The voltage produced by the said voltage source is preferably about 100 volts or less.

Suitable pyroelectric materials for the said pyroelectric target are doped lead zirconate titanate (PZT) and its derivatives, lead germanate $Pb_5Ge_3O_{11}$, lead germanate silicate $Pb_5Ge_{3-x}Si_xO_{11}$, $0 \leq x \leq 2.1$, and lithium sulphate. The material selected may be either single crystal material or polycrystalline (ie ceramic) material.

It is necessary for the product $R_T C_T$ to lie within the range $\frac{1}{2}\tau \leq R_T C_T \leq 1000\tau$, where $\tau$ is the scanning period, in order that (a) a significant proportion of the pyroelectric charge developed on the pyroelectric target can be stored until it is quenched by the ionic beam and (b) a suitable quantity of quenching charge can be transferred from the said voltage source to the surface of the pyroelectric target scanned by the ionic beam between successive scans.

Embodiments of the present invention will be described by way of example with reference to the accompanying drawing, which is a schematic diagram of a pyroelectric camera tube system embodying the present invention.

In the system illustrated in the drawing, an evacuated pyroelectric camera tube 1 contains a conventional cathode 3 held at ground potential and a conventional anode 5 held at a positive potential $+ V_1$. An electron beam 11 produced by the cathode 3 is accelerated towards the anode 5 by the potential difference $V_1$. It travels through the anode 5 down the tube 1 and is focussed by conventional electron focussing optics 7. The electron beam 11 is deflected by a conventional electron deflector 9 across the surface of a pyroelectric target 13. The target 13 may be a slice having a thickness in the range 10 – 100$\mu$m. It may be made of doped PZT or one of its derivatives, lead germanate $Pb_5Ge_3O_{11}$ (described in Jones et al U.S. Pat. No. 3,831,029, corresponding to copending United Kingdom Patent Application No 32616/72), lead germanate silicate $Pb_5Ge_{3-y}Si_yO_{11}$ $0 < y \leq 2.1$ (described in Jones et al U.S. Pat. No. 3,881,109, corresponding to copending United Kingdom Patent Application No 51699/72), or lithium sulphate. The target 13 is electrically connected and physically attached to an electrode 15. The electrode 15 may be made of nickel/chromium alloy; its thickness is typically a few hundred Angstrom units. The end of the tube 1 remote from the cathode 3 is sealed by an infra-red window 16 made, for example, of arsenic trisulphide or germanium. A conductor 17 is connected to the electrode 15 and leads in turn to a capacitor 23 and an amplifier 25. A voltage source 21 providing a steady positive potential $+V_2$ is also connected to the conductor 17 through a resistor 19 in parallel with the capacitor 23 and the amplifier 25.

It is necessary for the pyroelectric target 13 to be "poled." Poling is a known process involving the application of a high (between 10 and 30 kV/cm) steady electric field across the target 13 so that the ferroelectric domains may be aligned to provide a large and uniform electrical polarization. Poling of the target 13 may be performed before the target 13 is inserted in the tube 1 or when the target 13 is in the tube 1 by adopting a suitable known mode of operation of the tube.

The system operates in the following way. Thermal radiation (which is mainly infrared radiation) from a given scene is modulated by a conventional chopper (not shown) and is then incident on the electrode 15 via the window 16. Some of the radiation is absorbed by the electrode 15 and some is transmitted to the target 13. The radiation absorbed by the electrode 15 heats the electrode 15. The heat is conducted to the target 13. The radiation absorbed by the target 13 heats the target 13 directly. A thermal pattern is therefore produced on the target 13 corresponding to the intensity pattern of the infrared radiation emanating from the given scene being detected. The thermal pattern is converted into a corresponding electric charge pattern on the target 13 by the pyroelectric effect. Thus, at each instant of time the target 13 has a particular pattern of surface pyroelectric charge corresponding to the thermal state of the scene at that instant. As the electron beam 11 is scanned across the target 13, the corresponding pyroelectric electric charge is caused to overflow in the form of a current in the conductor 17; this is because the target 13 is effectively an electrical capacitor which is discharged when it is scanned by the electron beam 11. This signal produced in the conductor 17 is amplified by the amplifier 25 and then processed by conventional signal processing circuits (not shown) and recorded or displayed conventionally, for example on a cathode ray tube. The capacitor 23 is used to isolate the unidirectional voltage produced by the voltage source 21 from the a.c. components (not shown) in the signal processing circuits. The value of the resistor 19 (typically 1MΩ) is chosen to give an impedance in the order of ten times the input impedance of the amplifier 25.

The voltage source 21 is provided to allow positive charge to leak through the electrode 15 and the target 13 to quench each element of area of the target 13 having a residual negative charge after the pyroelectric charge has been electrically read out from that element of area by the electron beam 11. It is necessary for a suitable quantity of this charge to leak through in the field time $\tau_F$ which is the time between successive scans of a given area of the target 13 by the electron beam 11. However the time taken for charge to leak through the electrode 15 and the target 13 must also be long enough to allow storage of a significant proportion of the pyroelectric charge to occur between successive scans by the electron beam 11.

The time taken for charge to leak through the electrode 15 can be ignored (for the purposes of this explanation) because the electrical resistance of the electrode 15 is negligible compared with that of the target 13. The rate at which positive charge is collected on the surface of the target 13 which is scanned by the electron beam 11 is given by the equation:

$$V_p = V_2 \left(1 - \exp\left\{\frac{-\tau_F}{RC}\right\}\right) \quad (1)$$

where $V_p$ is the voltage on the surface of the target 13 scanned by the electron beam 11, $V_2$ is the voltage developed by the voltage source 21, $\tau_F$ is the field time and RC is the time-constant of the target 13, ie the product of its electrical resistance R and its electrical capacitance C. The need to have the leakage time through the target 13 short enough to allow a suitable positive charge to build up during successive scans but long enough to allow storage of a significant proportion of the pyroelectric charge to occur between successive scans can be expressed by the inequality:

$$x\tau_F \leq RC \leq y\tau_F \quad (2)$$

where $x$ and $y$ represent respectively the lower and upper acceptable limits to the number of multiples of the field time $\tau_F$ which the time constant RC can have. The pyroelectric charge developed on the surface of the target 13 scanned by the electron beam 11 leaks away at an exponential rate (i.e., a rate which has a form which is the complement of equation 1). The lower limit of inequality 2 is concerned with this feature of the leakage of the pyroelectric charge. If in this lower limit $x = 1$, for instance, then in the time RC a percentage $(1/e) \cdot 100\%$, i.e., about 37%, of the pyroelectric charge will leak away. Thus $x$ is preferably about 3 so that in the time RC only $(1/e3) \cdot 100\%$, i.e., about 2% of the pyroelectric charge will leak away. The upper limit is concerned with the feature mentioned above concerning suitably charging the surface of the target 13 scanned by the electron beam 11 with positive charge from the voltage source 21. Equation 1 can be simplified by expanding the exponential term and putting the condition $\tau_F << RC$ into the equation. This gives $$V_p = \frac{V_2 \tau_F}{RC} \quad (3)$$

Thus, in the upper limit (inequality (2)) when $RC = y\tau_F$.

$$y = V_2/V_p \quad (4)$$

It has previously been shown in the art that the necessary value of $V_p$ is about 0.5 volts for any pyroelectric target. The value of $V_2$ is determined by whatever is considered to be any unreasonably high voltage to use. It can be said that 100 volts is an acceptable limit for $V_2$. From equation (4) this gives $y = 200$. A typical value of $\tau_F$ is $2 \times 10^{-2}$ seconds. Therefore if the respective values $\tau_F = 2 \times 10^{-2}$ seconds, $x = 3$ and $y = 200$ are inserted in inequality 2 then the inequality becomes:

$$6 \times 10^{-2} \text{ secs} \leq RC \leq 4 \text{ secs} \quad (5)$$

However the system will still work even if $x$ is as small as ½ and $y$ is as great as 1,000.

If $R$ is measured in ohms and $C$ is measured in Farads then the product $RC$ is in seconds. The product RC may be alternatively expressed as the product $\rho\epsilon\epsilon_o$ where $\rho$ is the electrical resistivity of the target 13, $\epsilon$ is the relative permittivity of the target 13 and $\epsilon_o$ is the permittivity of free space, which is a constant.

It is difficult to exercise any controlled adjustment of the relative permittivity $\epsilon$. However the resistivity $\rho$ of a given material can be adjusted by doping the material. The conductivity often increases as a known function of the concentration of conducting dopant. Therefore PZT and its derivatives which do not have the correct resistivity can be doped, for example, with potassium, bismuth and uranium to give the required resistivity. Lead germanate, lead germanate silicate and lithium sulphate all have already the correct resistivity as made.

If the target 13 is made from material which does not strongly absorb infrared radiation at a wavelength of interest it can be replaced in another embodiment of the invention by a composite structure of a layer of pyroelectric material and a layer of infrared absorbing material such as a layer made from an organic polymer.

In an alternative embodiment of the invention the functions of the window 16 and the electrode 15 described with reference to the particular embodiment shown in the drawing may be combined by providing a single component which is both transparent in the infra-red region of the spectrum and electrically conducting.

I claim:

1. A pyroelectric camera tube system comprising a pyroelectric target for detecting by the pyroelectric effect thermal electromagnetic radiation incident thereon, means for repetitively scanning an ionic beam across a surface of said target, the product of the electrical resistance $R_T$ and the electrical capacitance $C_T$ of said target when scanned by said ionic beam being in the range from one-half of $\tau_F$ to 1,000 times $\tau_F$, where $\tau_F$ is the average scanning period at which said means for scanning is capable of scanning said surface, the limits of said range being inclusive, a pick-up electrode in electrical contact with said target, said pickup electrode operating to produce an output signal corresponding to the quantity of pyroelectric charge developed at the part of said surface scanned by said electron beam, an electrical impedance having one end thereof electrically connected to said electrode, and a voltage source connected to the other end of said impedance, said voltage source providing a substantially steady electrical output voltage operative to leak, by conduction through said impedance and through said target to said scanned surface of said target, a quantity of charge of the opposite polarity to said ionic beam to form on said scanned surface a bias charge pedestal having a magnitude independent of said pyroelectric charge, said leaked charge acting as a quenching charge on said scanned surface capable of quenching in said average scanning period any excess charge left on said scanned surface from said ionic beam.

2. A system as in claim 1 and wherein said target has a resistance $R_T$ and a capacitance $C_T$ whose product is in the range $100\tau_F \geq R_T C_T \geq 3\tau_F$.

3. A system as in claim 1 and wherein said target has a resistance $R_T$ in ohms and a capacitance $C_T$ in farads whose product is in the range $6 \times 10^{-2}$ seconds $\leq R_T C_T \leq 4$ seconds.

4. A system as in claim 1 and wherein said ionic beam is an electron beam and said voltage and said quenching charge are of positive polarity.

5. A system as in claim 1 and wherein said voltage has a magnitude of no more than 100 volts.

6. A system as in claim 1 and wherein said system additionally incorporates a signal processing circuit for processing the output signal of said electrode, and an electrical capacitor having one terminal connected to said electrode and the other terminal connected to said signal processing circuit.

7. A system as in claim 6 wherein said impedance is about 10 times the input impedance of said signal processing circuit as measured at said capacitor.

8. A system as in claim 1 and wherein said target is composed of lead germanate $Pb_5Ge_3O_{11}$.

9. A system as in claim 1 and wherein said target is composed of lead germanate silicate $Pb_5Ge_{3-y}Si_yO_{11}$, $0 \leq y \leq 2.1$.

10. A system as in claim 1 and wherein said target is composed of lithium sulphate.

* * * * *